United States Patent
Seol

(10) Patent No.: US 8,752,091 B2
(45) Date of Patent: Jun. 10, 2014

(54) METHOD FOR OUTPUTTING ELECTRONIC PROGRAM GUIDE AND BROADCASTING RECEIVER ENABLING OF THE METHOD

(75) Inventor: Seong Woon Seol, Gumi-si (KR)

(73) Assignee: LG Electronics Inc., Seoul (KR)

(*) Notice: Subject to any disclaimer, the term of this patent is extended or adjusted under 35 U.S.C. 154(b) by 386 days.

(21) Appl. No.: 12/994,788

(22) PCT Filed: Apr. 20, 2009

(86) PCT No.: PCT/KR2009/002034
§ 371 (c)(1),
(2), (4) Date: Dec. 30, 2010

(87) PCT Pub. No.: WO2009/145507
PCT Pub. Date: Dec. 3, 2009

(65) Prior Publication Data
US 2011/0093899 A1 Apr. 21, 2011

(30) Foreign Application Priority Data
May 27, 2008 (KR) .................. 10-2008-0049008

(51) Int. Cl.
*H04N 5/445* (2011.01)
(52) U.S. Cl.
USPC ................................. 725/39; 725/53
(58) Field of Classification Search
USPC ......................................... 725/39, 53
See application file for complete search history.

(56) References Cited

U.S. PATENT DOCUMENTS

| | | | |
|---|---|---|---|
| 2006/0095628 A1 | 5/2006 | Ludwig et al. | 710/302 |
| 2007/0033007 A1* | 2/2007 | Narahara et al. | 704/9 |
| 2007/0112935 A1 | 5/2007 | Espelien | |
| 2007/0124769 A1* | 5/2007 | Casey et al. | 725/46 |
| 2007/0143794 A1 | 6/2007 | Negi | |
| 2007/0214477 A1 | 9/2007 | Read | 725/38 |
| 2008/0052614 A1 | 2/2008 | Urabe et al. | 715/234 |
| 2008/0155085 A1* | 6/2008 | Yokoyama et al. | 709/223 |
| 2008/0184119 A1* | 7/2008 | Eyal et al. | 715/719 |

FOREIGN PATENT DOCUMENTS

| | | |
|---|---|---|
| EP | 1 161 092 A2 | 12/2001 |
| JP | 2007-158828 A | 6/2007 |
| JP | 2007-166363 A | 6/2007 |
| JP | 2008-054065 A | 3/2008 |
| KR | 10-2007-0057457 A | 6/2007 |

OTHER PUBLICATIONS

International Search Report issued in PCT Application No. PCT/KR2009/002034 dated Sep. 1, 2009.
European Search Report dated Jun. 11, 2012 issued in Application No. 09 75 4972.

* cited by examiner

*Primary Examiner* — Pankaj Kumar
*Assistant Examiner* — Franklin Andramuno
(74) *Attorney, Agent, or Firm* — KED & Associates LLP

(57) ABSTRACT

A method for outputting an EPG and a broadcasting receiver employing the method are disclosed. More particularly, a method for outputting an EPG and a broadcasting receiver employing the method are disclosed, in which the EPG output from the broadcasting receiver includes RSS information to allow a user to easily identify the RSS information from the EPG.

14 Claims, 5 Drawing Sheets

Fig. 2

| CH | Title | Address of RSS server | RSS information |
|---|---|---|---|
| 11 | New heart | Kwanghee university hospital (http://ww.gwanghee.) | [new text] for heart transplant... |
| | | Chest surgery meeting (http://ww.newheart.) | |
| | | Minjung love (http://ww.minjung.) | |
| ... | ... | ... | ... |

201 — CH
202 — Title
203 — Address of RSS server
204 — RSS information

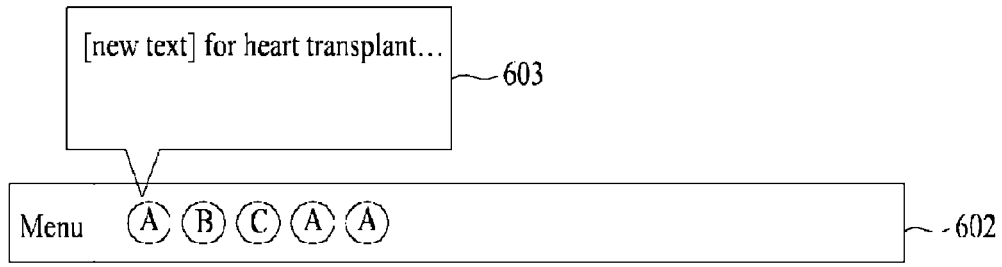

METHOD FOR OUTPUTTING ELECTRONIC PROGRAM GUIDE AND BROADCASTING RECEIVER ENABLING OF THE METHOD

TECHNICAL FIELD

The present invention relates to a method for outputting an electronic program guide (EPG) from a broadcasting receiver and a broadcasting receiver employing the method, and more particularly to, a method for outputting an EPG and a broadcasting receiver employing the method, in which the EPG output from the broadcasting receiver includes RSS information to allow a user to conveniently receive RSS information from the EPG.

BACKGROUND ART

Nowadays, as Internet is popularized, Internet users can upload their opinions on their interesting subjects in an Internet server, and services that provide contents uploaded in the Internet server as RSS information are continuing to increase.

RSS (RDF Site Summary or Really Simple Syndication, or Rich Site Summary) information means data generated based on XML to provide updated information from a web site where contents such as news or blog information continue to be updated, to users.

Meanwhile, in respect of broadcasting program provided from a broadcasting receiver, opinions or contents on subjects in which users are interested can be uploaded in an Internet server, and these opinions or contents can be generated as RSS information. However, the broadcasting receiver according to the related art does not provide such RSS information. In this respect, development of a method for conveniently providing users with RSS information is necessarily required.

DISCLOSURE OF INVENTION

Technical Problem

Accordingly, the present invention is directed to a method for outputting EPG and a broadcasting receiver employing the method, which substantially obviate one or more problems due to limitations and disadvantages of the related art.

An object of the present invention is to provide a method for outputting an EPG and a broadcasting receiver employing the method, in which the EPG output from the broadcasting receiver includes RSS information updated in an RSS server to allow a user to easily identify the RSS information updated in the RSS server, which is associated with a broadcasting program included in EPG data.

Another object of the present invention is to provide a method for outputting an EPG and a broadcasting receiver employing the method, in which a user can identify its interesting information updated in an RSS server from EPG data by allowing the user to input, edit, and delete its desired network address of the RSS server to, in, and from the EPG data.

Technical Solution

According to one embodiment of the present invention, a method for outputting an electronic program guide (EPG) from a broadcasting receiver comprises receiving EPG data; determining whether a network address of an RSS (Really Simple Syndication) server, which is associated with a broadcasting program included in the EPG data, is registered in an RSS database (DB); if RSS information is updated in the RSS server, receiving the updated RSS information; generating RSS EPG data including the updated RSS information; and outputting the RSS EPG data in a display screen.

According to another embodiment of the present invention, a broadcasting receiver for outputting EPG comprises a tuner receiving EPG data; an RSS information receiving module determining whether a network address of an RSS server, which is associated with a broadcasting program included in the EPG data, is registered in an RSS database, and if RSS information is updated in the RSS server, receiving the updated RSS information; an RSS EPG generating module generating RSS EPG data including the updated RSS information; and an output module outputting the RSS EPG data in a display screen.

ADVANTAGEOUS EFFECTS

According to the embodiments of the present invention, the following effects can be obtained.

Since the RSS information updated in the RSS server is included in the EPG data, the user can easily identify the RSS information updated in the RSS server, which is associated with the broadcasting program included in the EPG data.

In addition, since the user can input, edit, and delete its desired network address of the RSS server to, in and from the EPG data, the user can identify its interesting information updated in the RSS server from the EPG data.

BRIEF DESCRIPTION OF DRAWINGS

FIG. 2 is a diagram illustrating an example of an RSS database according to one embodiment of the present invention;

FIG. 5 is a diagram illustrating an example of RSS EPG data according to the present invention;

FIG. 6 is a diagram illustrating another example of RSS EPG data according to the present invention.

DESCRIPTION OF MAIN REFERENCE NUMERALS IN THE DRAWINGS

Figure 1:
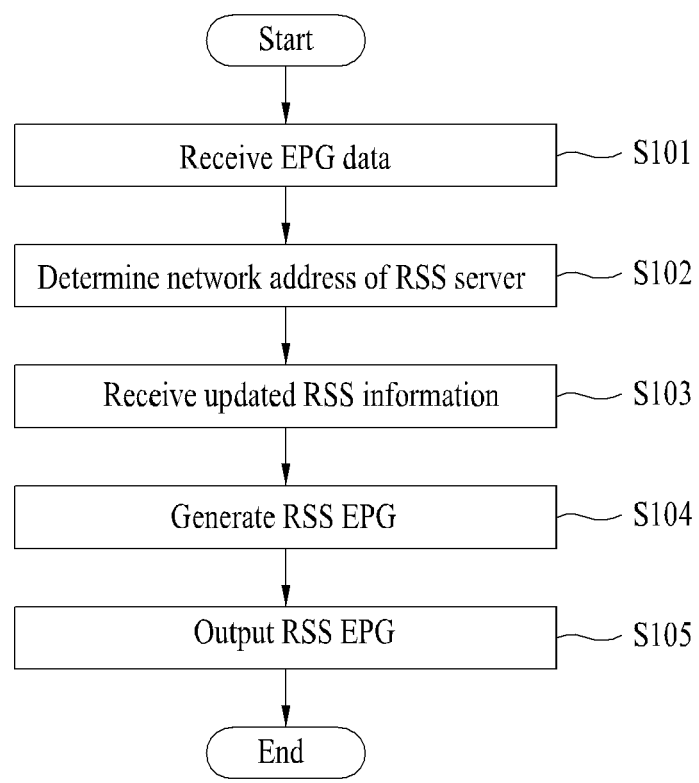
FIG. 1 is a flow chart illustrating a procedure of an operation of a broadcasting receiver according to the present invention.

701: tuner
702: RSS information receiving module
703: RSS EPG generating module
704: output module
705: user interface module
706: RSS database

BEST MODE FOR CARRYING OUT THE INVENTION

Hereinafter, a method for outputting EPG and a broadcasting receiver employing the method according to the present invention will be described in detail with reference to the accompanying drawings.

FIG. 1 is a flow chart illustrating a procedure of an operation of a broadcasting receiver according to the present invention.

Referring to FIG. 1, a broadcasting receiver according to the present invention receives EPG data through a predetermined tuner or a wire or wireless network in step S101.

In step S102, a broadcasting receiver determines whether a network address of an RSS server, which is associated with a broadcasting program included in the EPG data, is registered in an RSS database (DB).

At this time, the broadcasting receiver extracts a tile of a broadcasting program included in EPG data or a broadcasting program identifier by analyzing header information of the EPG data. Then, the broadcasting receiver can determine whether the address of the RSS server, which is associated with the broadcasting program, is registered in a memory with reference to the RSS database.

For example, if a title 'new heart' of a broadcasting program is included in the received EPG data, the broadcasting receiver reads out a network address 'http://gwanghee.com', 'http://newheart.com', 'http://minjung.com' of the RSS server, which corresponds to the 'new heart' from the RSS database.

FIG. 2 is a diagram illustrating an example of an RSS database according to one embodiment of the present invention.

Referring to FIG. 2, the broadcasting receiver of the present invention stores a network address 203 of the RSS server, which corresponds to a title 202 of a broadcasting program, in the RSS database.

At this time, the network address of the RSS server, which corresponds to the title of the broadcasting program, may be inputted by a user, or may be included in the EPG data. As another option, the broadcasting receiver may register the network address of the RSS server, which corresponds to a predetermined priority, after searching the title of the broadcasting program by itself.

If the user inputs a search word to be replaced with the title of the broadcasting program, the broadcasting receiver may register the network address of the RSS server, which corresponds to a predetermined priority, after performing a search from a predetermined search server using the corresponding search word.

If the user inputs the network address of the RSS server, the broadcasting receiver can output a user interface that can allow the user to input the network address of the RSS server, or to delete or edit the previously inputted network address of the RSS server. Also, the broadcasting receiver can be inputted with the network address of the RSS server by the user, or can delete or edit the previously inputted network address of the RSS server.

Figure 3:
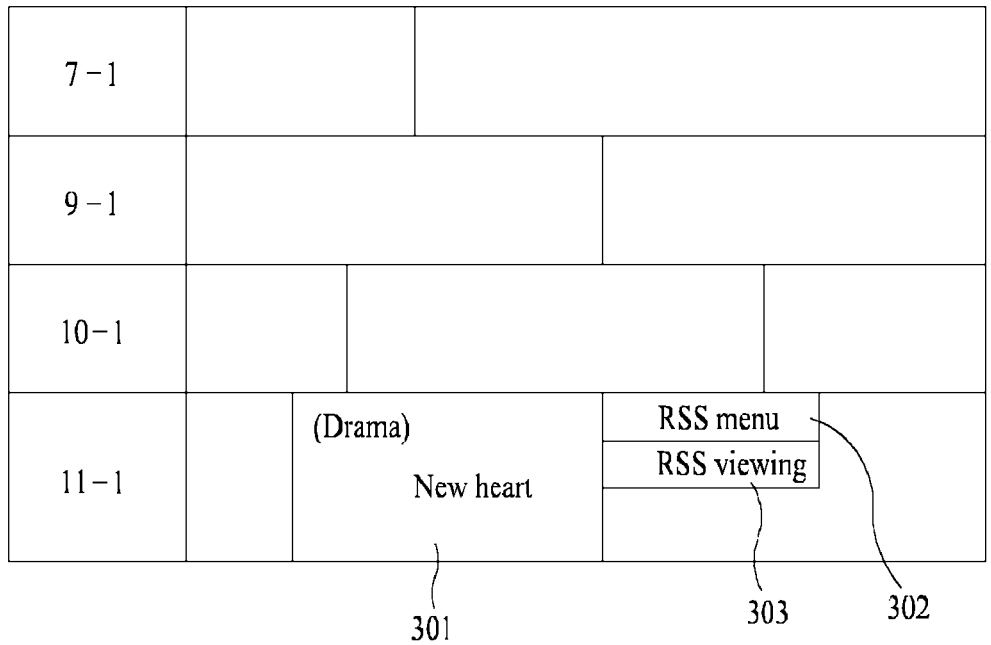
FIG. 3 and FIG. 4 are diagrams illustrating examples that a user inputs a network address of an RSS server from a broadcasting receiver in accordance with the present invention.
Figure 4:
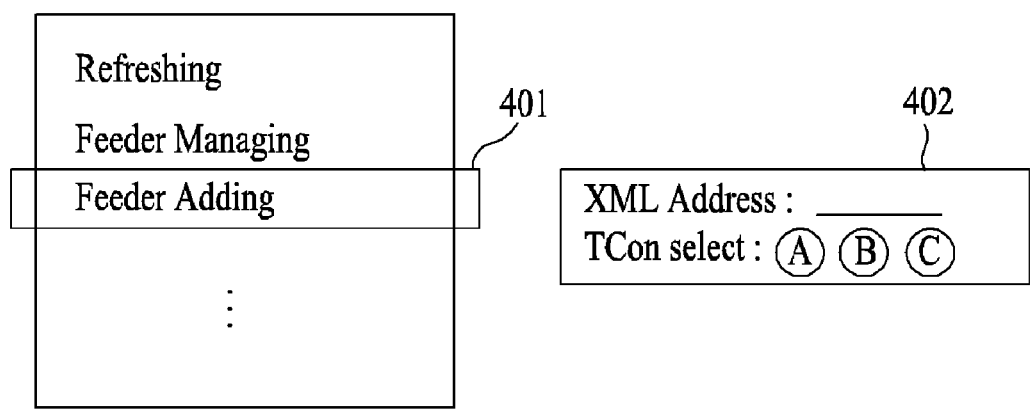

FIG. 3 and FIG. 4 are diagrams illustrating examples that a user inputs a network address of an RSS server from a broadcasting receiver in accordance with the present invention.

Referring to FIG. 3, if the user selects a title 301 of a predetermined broadcasting program from an EPG output screen, the broadcasting receiver outputs a user interface 302 that can select RSS menu associated with the corresponding broadcasting program.

If the user selects the RSS menu 302, the broadcasting receiver can output a user interface 402 that can allow the user to input the network address of the RSS server, after outputting a user interface as illustrated in FIG. 4.

The user can input an additionally desired network address of the RSS server, by the user interface 402, or can input an icon corresponding to the network address of the RSS server.

For example, the user can input a network address of the RSS server, i.e., 'http://minjung.com', can input a title of the corresponding RSS server as 'Minjung love' and can select a shape of the corresponding icon.

The broadcasting receiver can register the network address of the RSS server, which is inputted by the user, in the RSS database.

Furthermore, the user may delete or edit the network address of the RSS server, which is already registered in the RSS data base. If the user deletes or edits the network address of the RSS server, the broadcasting receiver updates the RSS database in accordance with the deleted or edited input.

According to the embodiment of the present invention, the network address of the RSS server can be included in the EPG data and then received in the broadcasting receiver. In this case, the broadcasting receiver parses the EPG data and then records the network address of the RSS server, which corresponds to the title of the broadcasting program, in the RSS database.

Furthermore, according to the embodiment of the present invention, the broadcasting receiver may search the title of the broadcasting program from a predetermined search server in conjunction with the search server, and then may record a network address of a predetermined priority in the RSS database.

For example, the broadcasting receiver may search new heart from the search server, and then may record a network address higher than a third priority in the RSS database.

In step S103 of FIG. 1, if the RSS information is updated in the RSS server with which the network address is registered, the broadcasting receiver receives the updated RSS information.

For example, the broadcasting receiver receives the updated RSS information from each of 'http://gwanghee.com', 'http://newheart.com', and 'http://minjung.com', and then stores the received RSS information in the RSS database.

At this time, the RSS (RDF Site Summary or Really Simple Syndication, or Rich Site Summary) information is based on XML, and could be format data of a predetermined standard for transmitting and receiving data on a web. If a new content is registered in the RSS server, the RSS information can be generated, and the broadcasting receiver can receive the RSS information received from the RSS server by using a separate RSS feeder manager program.

For example, if another user registers a new content titled for heart transplant by accessing the RSS server, the RSS server generates RSS information and transmits the RSS information to the broadcasting receiver, and the broadcasting receiver receives the RSS information.

The broadcasting receiver generates RSS EPG data including the updated RSS information in step S104, and outputs the generated RSS EPG data to a display screen in step S105.

At this time, the RSS EPG data can include one or more of a list of updated RSS information, an icon identifying the updated RSS information, a title of the updated RSS information, and a content of the updated RSS information.

FIG. 5 is a diagram illustrating an example of RSS EPG data according to the present invention. Referring to FIG. 5, if the user selects the title new heart of the broadcasting program from the RSS EPG data and then selects RSS viewing (501), the broadcasting receiver can output the RSS information. The RSS EPG data can include an icon 502 identifying the RSS server to which the updated RSS information is provided, a name 503 of the RSS server, and a title 504 of the updated RSS information.

The RSS EPG data can provide information as to whether the corresponding RSS server has been updated, the number of the updated RSS information, and information as to whether the user has read out the updated RSS information. If the user selects one of the icon, the name, and the title of the RSS information, XML type content can be output to the user interface.

Furthermore, the RSS information can be aligned in the order of the updated time, whether the user has read out the updated RSS information, the name of the RSS server, icon or title, and the number of recommendation times of the RSS information.

FIG. 6 is a diagram illustrating another example of RSS EPG data according to the present invention. Referring to FIG. 6, the broadcasting receiver according to the embodiment of the present invention can output a user interface 602 if the user selects RSS viewing (601). The user interface 602 can output the icon of the RSS server with which a new content is registered, in the order of time.

At this time, according to the embodiment of the present invention, the broadcasting receiver can allow the user to conveniently identify a content 603 registered in the RSS server from the EPG data by outputting the content 603 registered in the RSS server, which corresponds to the icon selected by the user.

Also, a search function is applied to the RSS EPG data. Thus, if the user inputs a keyword to be searched to the broadcasting receiver, the broadcasting receiver may output the search result by searching the corresponding keyword from the RSS information.

Furthermore, according to the embodiment of the present invention, the broadcasting receiver can be inputted with the number of RSS information included in the RSS EPG data by the user, and can receive the received number of RSS information.

For example, if the user inputs the number of the RSS information included in the RSS EPG as five (5), the broadcasting receiver can output EPG by receiving five numbers of RSS information and including the received RSS information in the EPG.

Accordingly, the present invention is advantageous in that the RSS information updated in the RSS server is included in the EPG data and then output to allow the user to easily identify the RSS information updated in the RSS server, wherein the RSS information is associated with the broadcasting program included in the EPG data.

Furthermore, the present invention is advantageous in that the user can input, edit, and delete its desired network address of the RSS server, which is to be output to the EPG data, so as to identify its interesting information updated in the RSS server from the EPG data.

Figure 7:
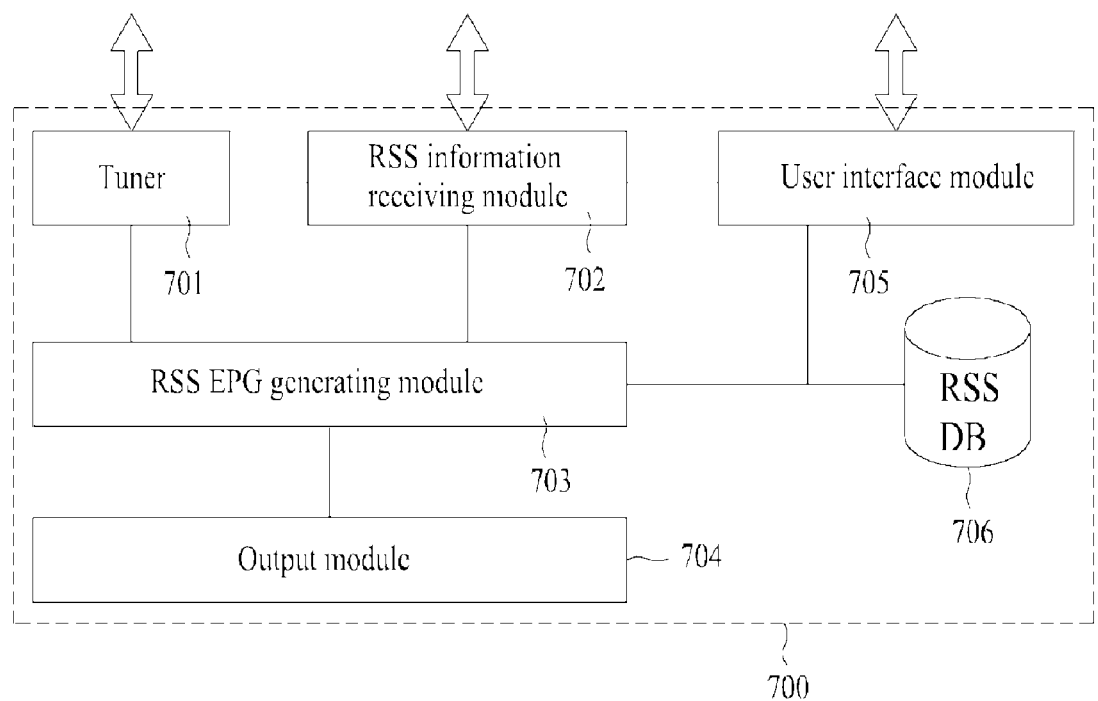
FIG. 7 is a block diagram illustrating a configuration of a broadcasting receiver according to one embodiment of the present invention.

FIG. 7 is a block diagram illustrating a configuration of a broadcasting receiver according to one embodiment of the present invention. Referring to FIG. 7, the broadcasting receiver that provides EPG in accordance with the embodiment of the present invention includes a tuner 701, an RSS information receiving module 702, an RSS EPG generating module 703, an output module 704, a user interface module 705, an RSS database 706.

The tuner 701 receives EPG data.

The RSS information receiving module 702 determines whether a network address of an RSS server, which is associated with a broadcasting program included in the EPG data, is registered in an RSS database, and if RSS information is updated in the RSS server, receives the updated RSS information.

At this time, the network address of the RSS server may be received by being included in the EPG data, or could be the result obtained by searching a title of the broadcasting program from a predetermined search site. Also, the RSS information could be XML data.

According to the embodiment of the present invention, the RSS information receiving module 702 can be inputted with the number of RSS information included in the RSS EPG data by the user, and can receive the inputted number of RSS information.

The RSS EPG generating module 703 generates RSS EPG data including the updated RSS information.

The output module 704 outputs the RSS EPG data in a display screen. At this time, the RSS EPG data can include one or more of a list of the updated RSS information, an icon identifying the updated RSS information, a title of the updated RSS information, and a content of the updated RSS information.

Furthermore, if the user selects one of the list of the updated RSS information, the icon identifying the updated RSS information, and the title of the updated RSS information, the output module 704 can output the selected one.

The user interface module 705 outputs a user interface module for inputting a network address of the RSS server, or deleting or editing the previously inputted network address of the RSS server. The user interface module 705 is inputted with the network address of the RSS server by the user, or is inputted with a delete or edit command of the previously inputted network address of the RSS server.

At this time, the RSS database 706 can record the network address of the RSS server, which is inputted by the user, or can be updated in accordance with the user s delete or edit input of the network address of the RSS server.

The broadcasting receiver has been described as above. Since the technical description of the aforementioned embodiments can be applied to the broadcasting receiver of FIG. 7, its detailed description will be omitted.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Various embodiments have been described in the best modes for carrying out the invention.

Industrial Applicability

According to the present invention, various kinds of traffic information can be transmitted using a DVB-H or DVB-T type broadcasting signal. In particular, traffic information according to time information can be displayed collectively.

The invention claimed is:

1. A method for outputting an electronic program guide (EPG) by a broadcasting receiver, the method comprising:
    receiving EPG data;
    when RSS information is updated in one or more Really Simple Syndication RSS server, receiving the updated RSS information;
    generating RSS EPG data including the updated RSS information; and
    outputting the EPG including the RSS EPG data in a display screen,
    wherein the RSS EPG data is configured as a format of an icon,
    wherein an icon corresponding to the RSS EPG data is displayed on at least one of an item indicating the broadcasting program and an area that is not in a form of a list included in the EPG,
    wherein an icon has an identifier based on a type of the RSS information, and wherein, when an icon is selected, RSS EPG data corresponding to the selected icon is sorted based on the type of the RSS information, wherein the broadcast receiver extracts a title of the broadcasting program included in the EPG data, searches one or more network addresses of the RSS servers associated with the extracted title of the broadcasting program from a search server, and records or edits one or more network addresses of a predetermined priority in an RSS database of the broadcast receiver.

2. The method as claimed in claim 1, further comprising:
outputting a user interface for inputting the network address of the RSS server, and registering the network address of the RSS server inputted by a user in the RSS database.

3. The method as claimed in claim 1, further comprising:
outputting a user interface for deleting or editing a previously inputted network address of the RSS server, and updating the RSS database based on deleting or editing input of the network address by a user.

4. The method as claimed in claim 1, wherein the RSS EPG data includes one or more of a list of the updated RSS information, an icon identifying the updated RSS information, a title of the updated RSS information, and a content of the updated RSS information.

5. The method as claimed in claim 4, further comprising:
when the user selects one of the list of the updated RSS information, the icon that can identify the updated RSS information, and the title of the updated RSS information, outputting the content of the RSS information corresponding to the selected one.

6. The method as claimed in claim 1, wherein receiving the updated RSS information includes:
being input with a number of RSS information to be included in the RSS EPG data by the user, and receiving the inputted number of RSS information.

7. The method as claimed in claim 1, wherein the RSS information is XML data.

8. A broadcasting receiver for outputting an electronic program guide (EPG), the broadcasting receiver comprising:
a tuner to receive EPG data;
a Really Simple Syndication (RSS) information receiving module to receive updated RSS information when the RSS information is updated in one or more RSS servers;
an RSS EPG generating module to generate RSS EPG data including the updated RSS information;
a controller to extract a title of the broadcasting program included in the EPG data, to search one or more network address of the RSS server associated with the extracted title of the broadcasting program from a search server, and to record or edit one or more network addresses of a predetermined priority in an RSS database of the broadcast receiver; and
an output module to output the EPG including the RSS EPG data in a display screen, wherein the output module outputs the RSS EPG data that is configured as a format of an icon, wherein an icon corresponding to the RSS EPG data is displayed on at least one of an item indicating the broadcasting program and an area that is not in a form of a list included in the EPG, wherein an icon has an identifier based on a type of the RSS information, and wherein, when an icon is selected, RSS EPG data corresponding to the selected icon is sorted based on the type of the RSS information.

9. The broadcasting receiver as claimed in claim 8, further comprising a user interface module for inputting the network address of the RSS server by a user, wherein the RSS database registers the network address of the RSS server therein.

10. The broadcasting receiver as claimed in claim 8, further comprising a user interface module for outputting a user interface for deleting or editing the input network address of the RSS server and receiving a delete or edit input of the network address from a user, wherein the RSS database is updated in accordance with the delete or edit input.

11. The broadcasting receiver as claimed in claim 8, wherein the RSS EPG data includes one or more of a list of the updated RSS information, an icon identifying the updated RSS information, a title of the updated RSS information, and a content of the updated RSS information.

12. The broadcasting receiver as claimed in claim 11, wherein, when the user selects one of the list of the updated RSS information, the icon that can identify the updated RSS information, and the title of the updated RSS information, the output module outputs the content of the RSS information corresponding to the selected one.

13. The broadcasting receiver as claimed in claim 8, wherein the RSS information receiving module includes inputting a number of RSS information to be included in the RSS EPG data by the user, and receiving the inputted number of RSS information.

14. The broadcasting receiver as claimed in claim 8, wherein the RSS information is XML data.

\* \* \* \* \*